April 15, 1941. R. R. NYDEGGER 2,238,128
WINDING APPARATUS
Filed Oct. 20, 1938 4 Sheets-Sheet 2

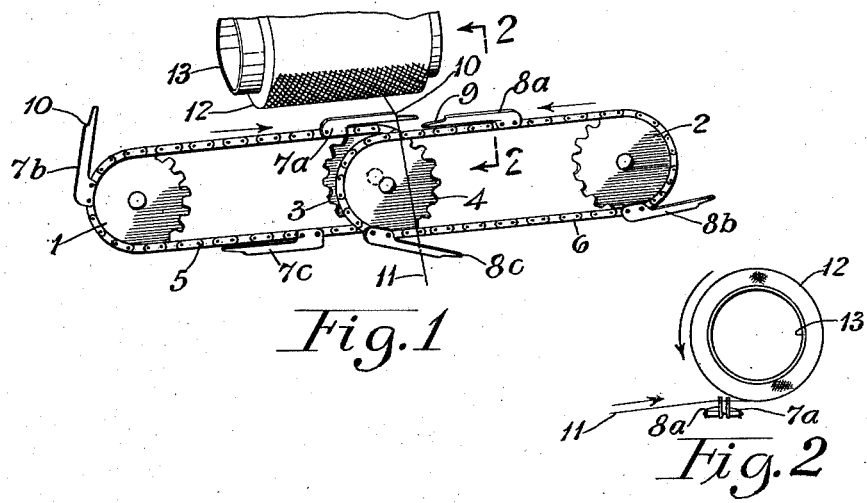

Roland Roswell Nydegger INVENTOR.
BY
ATTORNEY

April 15, 1941.   R. R. NYDEGGER   2,238,128
WINDING APPARATUS
Filed Oct. 20, 1938   4 Sheets-Sheet 3

Roland Roswell Nydegger INVENTOR.
BY
ATTORNEY

April 15, 1941.     R. R. NYDEGGER     2,238,128
WINDING APPARATUS
Filed Oct. 20, 1938     4 Sheets-Sheet 4

INVENTOR.
Roland Roswell Nydegger
BY
ATTORNEY

Patented Apr. 15, 1941

2,238,128

UNITED STATES PATENT OFFICE 2,238,128

WINDING APPARATUS

Roland Roswell Nydegger, Wilmington, Del., assignor to E. I. du Pont de Nemours & Company, Wilmington, Del., a corporation of Delaware Application October 20, 1938, Serial No. 235,924

5 Claims. (Cl. 242—43)

This invention relates to improvements in apparatus for winding filaments, threads, yarns, strands, cords, and similar structures. More particularly, it relates to a traversing mechanism for directing the paths of movement of the threads, yarns, and the like while winding the same at high speeds on to a bobbin, tube, core or other support. The term "yarn" as used throughout the specification and claims is intended to include filaments, threads, strands as well as plied and cabled structures which are wound on a rotating support by traversing the same back and forth across a section of the surface of said support.

Recent advances in the textile arts have made it possible to spin yarns at very high speeds. This is particularly true in the extrusion spinning of yarns from filament-forming compositions, for example, in the direct spinning of yarns composed of synthetic filaments from molten filament-forming compositions hereinafter referred to as melt spinning. Likewise it was desirable in some instances to withdraw yarn from one package and wind it into another at a very rapid rate.

Heretofore, in the conventional winding of yarns on rotating supports such as spools, bobbins, cores or the like, the yarns were generally traversed back and forth across the face of the support by means of a reciprocating or oscillating guide. While such reciprocating or oscillating traverse members operate successfully at lower yarn speeds, when the yarn speed is increased to a certain point, the yarn begins to build up faster at the ends of the bobbin than at the central section of the latter since the reversal is not sufficiently rapid. This objectionable building up of yarn at the ends of the bobbin is due to the necessity of stopping the reciprocating or oscillating traverse guide at the extreme ends of its stroke. The maximum winding speeds with such previously known traverse devices are limited by the time required to reverse the direction of the traversing mechanism, and also by the vibration imparted to the traverse guide by the forces involved in the movement of the reciprocating parts. This vibration and resultant excessive wear become progressively more serious as the speed is increased and are particularly serious when operating at speeds of the order attainable in melt spinning. Furthermore, the power consumption for such mechanisms is excessive. Likewise, the high speed of travel of the yarn through the yarn guide tends to cause excessive wear at the point of contact with the guide which necessitates early replacement and results in degradation of the yarn.

It is, therefore, an object of this invention to provide a new and improved apparatus for rapidly traversing yarns and the like back and forth while being wound on to a bobbin, tube, core or the like.

It is another object of this invention to provide a new and improved apparatus which will traverse yarns and the like back and forth while being wound on to a bobbin or the like without the use of reciprocating parts.

It is a still further object of this invention to provide in combination with an apparatus which will rapidly traverse a textile yarn back and forth while being wound on to a bobbin and the like, a yarn guide so arranged that the point of contact of the yarn with the guide continuously changes thereby eliminating excessive wear at a single point.

Other objects of the invention will appear hereinafter.

The objects of this invention are accomplished, in general, by providing a yarn traversing mechanism in which yarn guides are caused to move continuously in opposite directions across the face of the package upon which the yarn is being wound, which guides alternately direct the movement of the yarn from side to side in their respective directions of travel.

The invention will be more clearly apparent by reference to the following detailed description taken in connection with the accompanying drawings in which:

Figure 1 is a schematic drawing of one modification of the invention.

Figure 2 is a cross sectional view of the apparatus shown in Figure 1.

Figure 3 is a schematic drawing of another modification of the invention.

Figure 4 is a cross sectional view of the apparatus shown in Figure 3.

Figure 7:
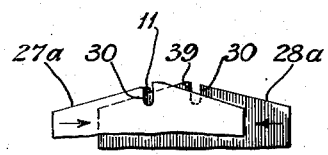
Figure 8:
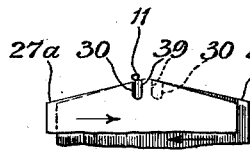
Figure 9:
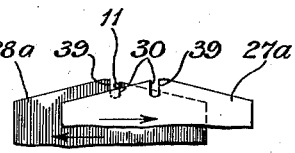
Figure 5:
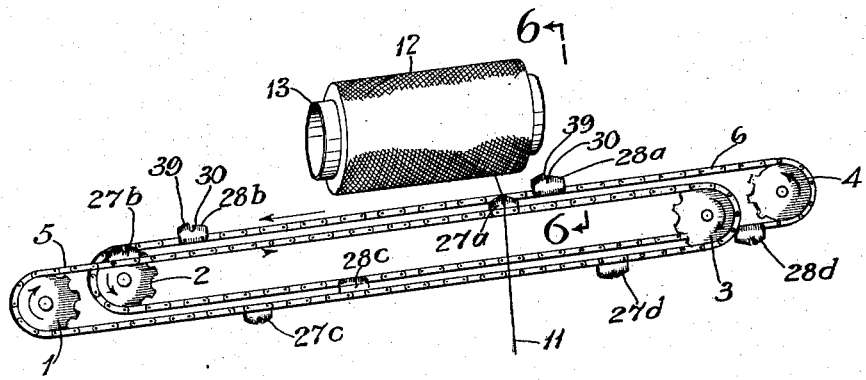
Figure 5 is a schematic drawing of another modification of the invention.
Figure 6:
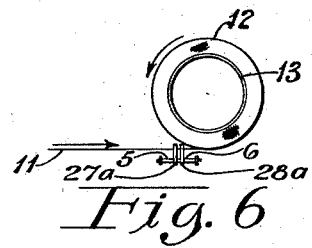
Figure 6 is a cross sectional view of the apparatus shown in Figure 5.

Figures 7, 8, and 9 are greatly enlarged views showing sections of the yarn guides of Figure 5 in different positions.

Figure 10:
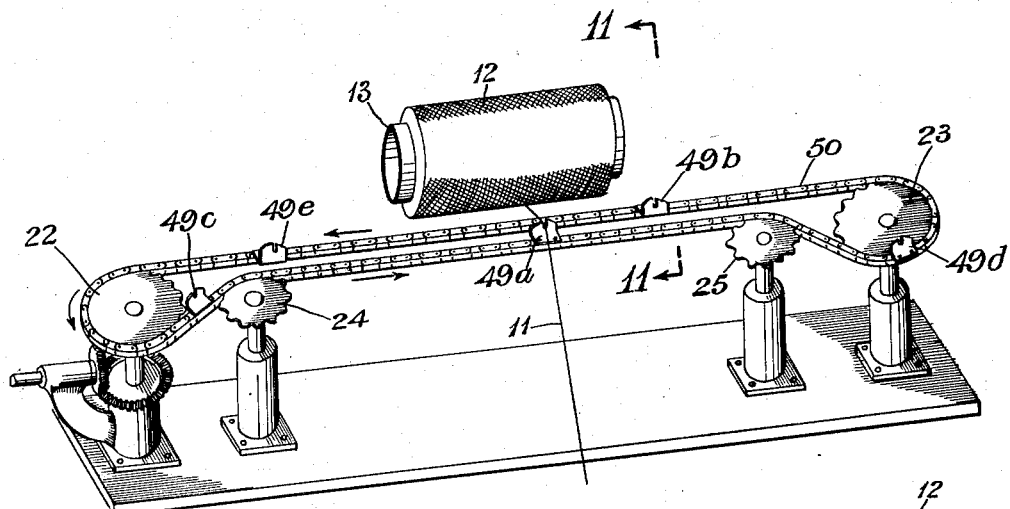

Figure 10 is a schematic view of still another modification of the invention.

Figure 11:
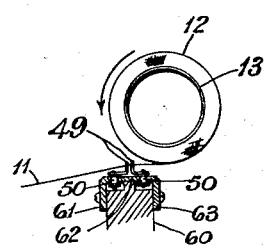

Figure 11 is a cross sectional view of the apparatus shown in Figure 10.

Figure 12:
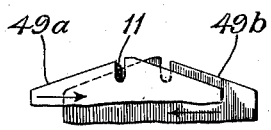
Figure 13:
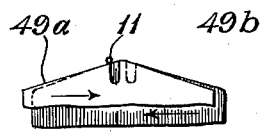
Figure 14:
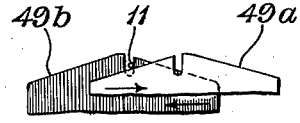

Figures 12, 13, and 14 are greatly enlarged views showing sections of the yarn guides of Figure 10 in different positions.

Figure 15:
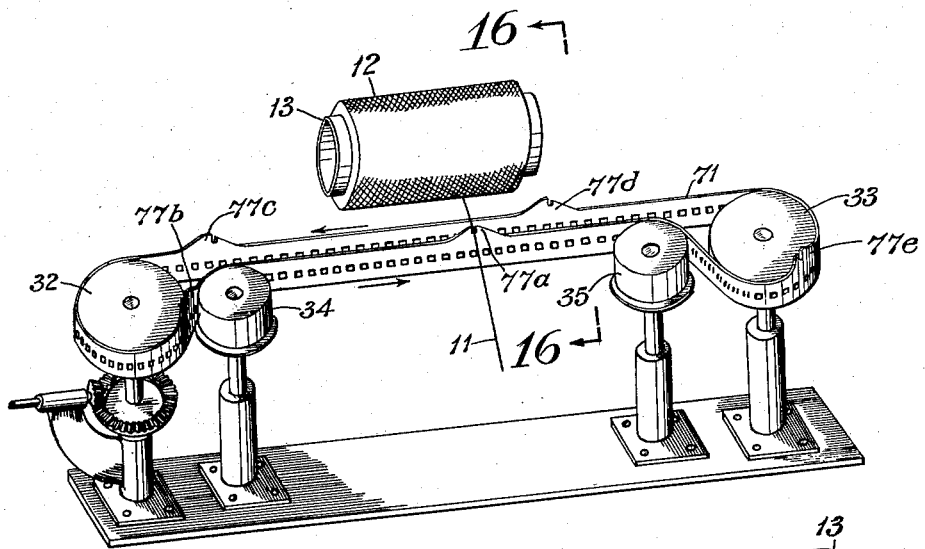

Figure 15 is a schematic view of a modification of the invention, similar to that shown in Figure 10.

Figure 16:
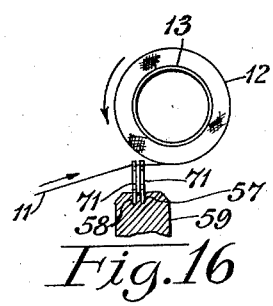

Figure 16 is a cross sectional view of the apparatus shown in Figure 15.

Figure 17:
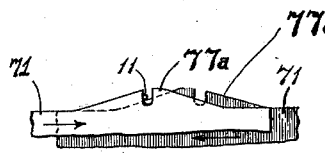
Figure 18:
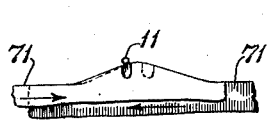
Figure 19:
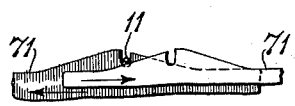

Figures 17, 18, and 19 are greatly enlarged views showing sections of the yarn guide of Figure 15 in different positions.

Figure 20:
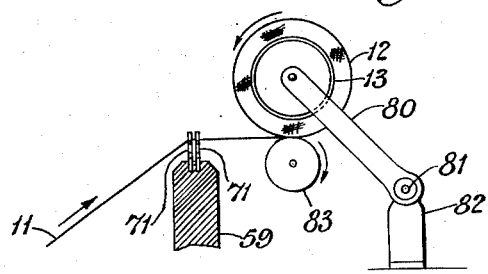

Figure 20 is a diagrammatic side elevational view of a modified form of the apparatus shown in Figure 16.

Referring to Figures 1 and 2, there is shown at 13, a bobbin which is mounted on a rotatable frame (not shown). The bobbin 13 is positively driven in the direction shown by the arrow in Figure 2. At 12 is shown a cake of yarn which is being wound upon the bobbin 13. The yarn 11 is passed to the bobbin 13 from any desired source, for example, a spinning machine, or from another wound package. As the yarn passes towards the bobbin 13 it is engaged by one of the yarn guides 7a, 7b, 7c or 8a, 8b or 8c. These yarn guides are caused to pass between the bobbin and the source of yarn supply in such a manner that the yarn will automatically be caught thereby and be traversed back and forth across a section of the bobbin. Yarn guides 7a, 7b, and 7c are connected to a chain 5 which is driven by means of sprocket wheels 1 and 3 and rotated in a clockwise direction. The yarn guides 8a, 8b, and 8c are mounted on chain 6, which chain is driven by means of sprocket wheels 2 and 4 rotating in a counter-clockwise direction.

The relative positions of the bobbin 13, the cake 12, the guides 7a and 8a, and the position of the yarn 11 are clearly shown in Figure 2. It is apparent from this figure that the guides 7a and 8a in turn deflect the yarn slightly from a position tangent to the cake 12. This causes the yarn to ride on the guides with a slight downward pressure, and thus facilitates the control of the yarn by the guides. This also causes the yarn to become automatically positioned in the guide when winding is started with the apparatus in motion.

The individual yarn guides 7a, 7b, 7c and 8a, 8b, 8c are provided with a leading edge 10 which is adapted to engage the yarn and traverse the same across the face of the bobbin, and outwardly engaging projections 9 which are adapted to pass under the yarn just prior to engagement of the yarn by the leading edge 10. The chains 5 and 6 are positioned about sprocket wheels in such a manner that the yarn guides will be caused to move about the sprocket wheels and disengage from the yarn at a predetermined point. The yarn guides are positioned on the oppositely moving chains 5 and 6 in such a manner that as soon as one yarn guide traveling in one direction is disengaged from the yarn, a yarn guide traveling in the opposite direction immediately engages the yarn for opposite traverse.

In the operation of the apparatus shown in Figures 1 and 2 of the drawings, chains 5 and 6 are traveling at identical speeds in opposite directions. The guide 7a is shown traveling toward the righthand side as viewed in the drawings. This yarn guide 7a carries the yarn 11 in contact with its leading edge 10 and supported by forward projecting portion 9. As the guide 7a continues to move to the right, the chain link upon which the said guide is mounted approaches the sprocket 3, and in passing about the same begins to drop. Due to the shape of the guide and its mounting on the chain, the leading edge 10 which engages the yarn 11 falls very rapidly thus lowering the yarn and finally dropping out of contact with the yarn.

While the yarn guide 7a is advancing toward the dropping position, the yarn guide 8a has advanced towards the lefthand side as shown in the drawings so that its forward projecting portion 9 is directly under the yarn 11 at the instant of the rapid drop of the leading edge 10 of the yarn guide 7a. The yarn 11 is thus lowered into contact with the forward projecting portion 9 of the guide 8a and the transfer is completed. The yarn is then traversed across the face of the bobbin by the thread guide 8a to its lefthand extremity, whereupon a similar series of movements occur transferring the yarn from the guide 8a to the guide 7b which in turn carries it to the right and transfers it to the guide 8b. The yarn is thus traversed back and forth across the face of the bobbin 13 smoothly and without jerking by alternate contact with the guides traveling continuously at uniform speeds in opposite directions.

Referring now to the modification of the invention shown in Figures 3 and 4 of the drawings, a plurality of yarn guides 17a, 17b, 17c, and 17d are shown mounted on chain 5, which chain is moved by means of sprocket wheels 1 and 3 which rotate in a clockwise direction. Similarly, yarn guides 18a, 18b, 18c, and 18d are mounted on chain 6, which chain is driven by means of sprocket wheels 2 and 4 which rotate in a counter-clockwise direction. The yarn 11 which is being wound on bobbin 13 to form cake 12 may have any desired source. The yarn is caught by the vertical portion of one of the yarn guides, by yarn guide 17a as shown in Figure 3, by means of which the yarn is traversed across the face of the bobbin. The yarn guide 17a, as well as the other yarn guides, is provided with an extended vertically projecting face which is adapted to engage the yarn and cause it to be traversed across the face of the bobbin. As the yarn is traversed by one of the yarn guides it is caused to be lifted by means of one of the wipers 19 or 20. The wiper 20, as shown in Figure 3, contains an upwardly inclined top edge which ends abruptly in a sharply inclined top edge 20a. The wiper 19 is similarly shaped. As the yarn is being traversed it is gradually lifted upwardly along the face of the yarn guide until it reaches the sharply inclined edge 19a or 20a by which the yarn is abruptly lifted from the yarn guide. The yarn automatically slides down the inclined edge of the wiper, and immediately thereafter it is engaged by the oppositely directed yarn guide to be traversed across the face of the bobbin in the opposite direction.

In the operation of the modification of the invention shown in Figures 3 and 4, the yarn 11 is shown as being carried to the righthand side as viewed in the drawings. The yarn 11 is supported vertically by the sloping surface of the wiper 20, and receives only the horizontal component of its motion from the guide. As the righthand edge of the cake 12 is approached, the yarn 11 is guided up the steep incline 20a at the outward end of the wiper 20.

The momentum of the yarn, due to its travel in the righthand direction, causes it to continue to move to the right and up the steep incline 20a past the point where it is raised out of contact with the guide 17a. The guide 17a, therefore, passes to the right, out of the operative position. The yarn 11 carried up the steep incline 20a loses its momentum and begins to slide down to the left; at this moment the guide 18a comes into position, catches the yarn 11 and guides it to the lefthand side. Here the wiper action is repeated on the steep incline 19a of the wiper 19 thus transferring the yarn from guide 18a to guide 17b. Succeeding carriers perform identical functions at each end of the cake 12.

In the modification shown in Figures 3 and 4, it is evident that the yarn 11 in passing to the right first contacts the wiper 19 and then the guide 17a. Similarly, during its transfer the yarn first contacts the wiper 20 before it can contact the guide 18a. These relative positions are preferable since the wipers effect the transfer of the yarn.

It is to be noted that in this modification of the invention, the wear on both the guides and the wipers is distributed over a wide surface. The wipers 19 and 20 slope upwardly toward the outer edges so that the contact point of the yarn against the guides is continuously varying in a vertical direction as it is traversed from side to side. In other words, as the yarn moves along the sloping surface of the wipers 19 and 20, it is raised and lowered so that the point of contact of the yarn with the guides, as well as the wipers, is continuously changed. The large surface exposed to the abrasive action of the yarn is, therefore, less subject to wear. Not only is it less subject to wear because the yarn is not confined to one point, but normal wear does not form grooves in the guides or wipers, and the yarn is not damaged by passing over a guide or wiper even though the latter is slightly worn. For this reason a greater total amount of wear can be experienced without the necessity of replacement and without damaging the yarn.

In the modification of the invention shown in Figures 5, 6, 7, 8, and 9, the arrangement and motion of the parts is the same as that shown in Figures 3 and 4 except that the wipers 19 and 20 have been eliminated. The yarn guides 27a, 27b, 27c, 27d and 28a, 28b, 28c, 28d are differently shaped from those shown previously in that they have edges inclined upwardly toward a slotted center. These edges replace the steep incline of the wipers 19 and 20 of Figures 3 and 4.

It will be noted that the leading edges 39 of the guides 27a and 28a, respectively, are somewhat higher than the lagging edges 30. This is more clearly apparent in Figures 7, 8, and 9. In these figures the yarn 11 is shown in operative contact with the lagging edge 30 of the guide 27a.

In the operation of this modification of the invention, the yarn 11 being wound on the bobbin 13 to form the cake 12 is carried to the right by the guide 27a in a manner similar to that of the previously described modifications. As the guide 27a approaches the righthand edge of the cake 12, as viewed in the drawings, the movement of the chains is so synchronized that the guide 27a meets the guide 28a. The yarn coming into contact with the leading edge of the guide 28a is raised and since the leading edge of guide 28a is higher than the lagging edge of 27a, the yarn is raised out of contact with the guide 27a whereupon it falls into the corresponding vertical slot of the guide 28a and is carried to the left edge of the cake by the lagging edge 30 of guide 28a where the operation is repeated.

The way in which this transfer occurs will be more apparent from a reference to Figures 7, 8, and 9. In Figure 7, the guide 27a is carrying the yarn 11 to the right. Its resistance to this horizontal displacement holds it against the lagging edge 30 of the slot. The approach of the leading edge 39 of the guide 28a also contributes to the holding of the yarn against the lagging edge 30 of the slot. The approach of edge 39 of guide 28a raises the yarn 11 which still remains in the vertical slot of the guide 27a. Thus the forcing of the yarn against the said lagging edge 30 causes it to clear the guide 27a entirely when it is raised sufficiently by the leading edge of guide 28a. The relative positions of the guides and the yarn at the instant of transfer are shown in Figure 8. An instant later, the yarn 11 is carried down in the slot of guide 28a to be traversed toward the lefthand side of the bobbin by the lagging edge 30. The relative positions of the various elements under these conditions are shown in Figure 9.

Deflectors similar to the wipers shown in Figures 3 and 4, but without the steep incline at the edges, might be inserted in the modification of the invention shown in Figures 5 to 9 in a similar relationship to the guides as in the modification shown in Figures 3 and 4. The slopes of these deflectors would not be sufficient to raise the yarn out of the slots in the guides but would serve to change the vertical position of the yarn as it travels from side to side thus distributing the wear uniformly along the edges of the slots and preventing excessive wear at the bottom of the slots.

In Figures 10, 11, 12, 13, and 14 is shown a modification of the invention similar to that shown in Figures 5 to 9. In Figures 10 to 14, the two chains traveling in opposite directions have been replaced by a single chain 50. The yarn guides represented generally by 49 are shown mounted at equal distances apart on the chain 50. The chain 50 passes about the sprockets 22 and 23 and behind the sprockets 24 and 25. The sprocket 22 may be driven in the direction shown by the arrow while the sprockets 23, 24, and 25 idle about shafts passing through their centers. In passing in front of the sprockets 24 and 25 two portions of the chain 50 are brought in close parallel relationship in front of the bobbin and cake. The relationship of the two positions of the chain as it passes in front of the cake is shown more clearly in Figure 11. The two parallel sections of chain traveling in opposite directions are maintained in a definitely spaced relationship to each other by means of guiding members 61, 62, and 63 which are mounted on a support 60, see Figure 11.

In the operation of this modification of the invention, the one chain travels continuously in one direction. The yarn 11 is shown being carried to the righthand side, as viewed in Figure 10, by the guide 49a. The guide 49b is shown in Figure 10 approaching the yarn on its travel to the lefthand side, the chain having turned about the sprocket 23. The transfer of the yarn from the guide 49a to the guide 49b occurs in the same manner as the yarn transfer from guide 27a to guide 28a described above with reference to the modification shown in Figures 5 to 9. This is clearly illustrated by Figures 12, 13, and 14. The chain, after traveling about sprocket wheel 23 and reversing its direction past the cake, reverses the position of the guides so that the leading and lagging edges are in the correct relative positions for the transfer of the yarn as described in the modification shown in Figures 5 to 9. Again a thread deflector may be used to spread the wear on the guides.

In Figures 15, 16, 17, 18, and 19 is shown a modification similar to that shown in Figures 10 to 14, and in which the chain is replaced by a steel band 71. The band 71 is provided with a plurality of spaced openings to permit engagement of teeth on drive reels 32 and 33 to provide the driving means.

A pair of idler rolls 34 and 35 may be, if desired, positioned to contact the band 71 to maintain the two sections of the band which are traveling in opposite directions, in a close parallel relationship to each other. This definite spacing of the two sections of band 71 can be still better controlled by means of a support 59 containing parallel slots 57 and 58 in which the band may travel.

The band is provided with integral yarn guides 71a, 71b, 71c, 71d, and 71e which are formed, at their top portions, the same as the yarn guides shown in Figures 5 to 9 and Figures 10 to 14. These yarn guides function to traverse the yarn 11 in the same manner as yarn guides 27a and 27b, which were described with reference to Figures 5 to 9. This is, furthermore, clearly illustrated in Figures 17, 18, and 19.

It is obvious in all the modifications of the invention that as the cake on the bobbin becomes thicker and thicker the vertical position of the yarn when it contacts the cake changes relative to the traversing guides. While this does not, in general, affect the operation of the invention, it is within the scope of this invention to provide means to keep the winding level on the package, relative to the yarn guides, fixed regardless of the size of the cake. This may be done in several ways, well known to the art.

One way of accomplishing this is by mounting the bobbin 13 on a rotatable spindle which in turn is carried by a swing arm 80, as shown in Figure 20. The swing arm 80 is pivoted at 81 to a support 82. The bobbin may then be driven by means of a surface drive roller 83 whereby the bottom surface of the yarn cake 12 will be continuously maintained at a predetermined level with reference to traversing band 71 and support 59.

It is obvious that a band can be substituted for any of the chains shown in the various modifications of the invention. In fact, the invention is not limited to the use of endless chains or metal bands. Belts and the like or any other moving surfaces which move past the package being wound may be used.

While the invention has been described for use on a single wind-up position, it is obvious that the modifications illustrated in Figures 3, 4, 5, 6, 7, 8, and 9 could be used for traversing a plurality of yarns at a plurality of wind-up positions.

Although the invention is described principally for guiding textile yarn, it can be used for the guiding and winding of wire or any filamentous materials. It may advantageously be used for the winding of fine ribbons and the like. The shape of the guides may obviously be modified according to the type of material being used.

Although the invention is valuable for the winding of any filamentous material, it has particular utility in the winding of yarns, ribbons, and the like spun from synthetic linear polymers since these materials are capable of being spun directly from melt and at very rapid rates. Furthermore, the filaments produced from these synthetic linear polymers are capable of being cold drawn several hundred per cent. On being cold drawn, these filaments become oriented. It is very important that when they are cold drawn, they be drawn uniformly. For this reason, any sudden changes in tension during the winding of the undrawn filaments which would result in accidental cold drawing are to be avoided if uniformly drawn filaments are to be produced in a subsequent operation.

By the practice of this invention it is possible to wind these undrawn filaments at rates in the range of 3,000 to 5,000 feet per minute without introducing any perceptible strain which would cause partial drawing of the yarn. It is possible to obtain well-formed cakes on the wound packages according to this invention at these rapid rates.

The practice of this invention permits the complete elimination of the reversal in direction of the forces encountered through the use of reciprocating parts used in prior art traversing mechanism. By their elimination, it is possible to wind well-formed packages at uniform tensions and at extremely rapid rates without excessive vibration, wear or power consumption. By combination with this traversing mechanism of the yarn guide described, it is possible to eliminate wear on the yarn guide to a great extent and to spread the wear which does occur over a wide surface thereby eliminating any wear in local areas which would damage the yarn upon passing across these areas.

Since it is obvious that many changes and modifications can be made in the above-described details without departing from the nature and spirit of the invention, it should be understood that the invention is not to be limited except as set forth in the appended claims.

I claim:

1. In an apparatus for the winding of yarns, a rotatable yarn supporting element, a yarn traversing mechanism comprising a plurality of yarn carrying members adapted to travel in opposite directions adjacent to said element and in lines substantially parallel to the axis thereof, said members having a slotted central portion and sides inclined to the direction of movement of the members, whereby the passage of two oppositely traveling members will disengage the yarn from one member and cause the engagement of the yarn by the other member.

2. In an apparatus for the winding of yarns, a rotatable yarn supporting element, a yarn traversing mechanism comprising yarn carrying members adapted to travel at a uniform speed in opposite directions adjacent to said element and in lines substantially parallel to the axis thereof, said members having a slotted central portion and sides inclined to the direction of movement of the members whereby the passage of two oppositely traveling members will disengage the yarn from one member and cause the yarn to be engaged by the other member, and means for continuously moving the yarn along said slotted portion.

3. In an apparatus for the winding of yarns, a rotatable yarn supporting member, a yarn traversing mechanism comprising two flexible elements adapted to travel in opposite directions adjacent to said member and in lines substantially parallel to the axis thereof, yarn carrying members rigidly fixed on said elements, and mutually cooperative means on said yarn carrying members for transferring the yarn from one of said members to the other at points where the said members pass each other.

4. In an apparatus for the winding of yarns, a rotatable yarn supporting element, a yarn traversing mechanism comprising a plurality of yarn carrying members adapted to travel in opposite directions adjacent to said element and in lines substantially parallel to the axis thereof, said members having a slotted central portion and sides inclined to the direction of movement of the members, the first approaching inclined sides of said members being slightly higher than the opposite sides of said members, whereby the passage of two oppositely traveling members will disengage the yarn from one member and cause the engagement of the yarn by the other member.

5. In an apparatus for the winding of yarns, a rotatable yarn supporting element, a yarn traversing mechanism comprising yarn carrying members adapted to travel continuously in opposite directions adjacent to said element and in lines substantially parallel to the axis thereof, oppositely inclined yarn engaging surfaces on the sides of said members first approaching each other, means for moving said yarn engaging surfaces past each other, the inclined yarn engaging surfaces, upon approaching each other, lifting the yarn to disengage the same from one of said members and cause the same to be engaged by another of said members.

ROLAND ROSWELL NYDEGGER.